United States Patent
Lim et al.

(10) Patent No.: US 7,674,838 B2
(45) Date of Patent: Mar. 9, 2010

(54) CURABLE FOAM ELASTOMERIC COMPOSITIONS

(75) Inventors: Thomas Fay-Oy Lim, Killingworth, CT (US); James E. Lionberger, Rocky Hill, CT (US); Steven T. Nakos, Wethersfield, CT (US)

(73) Assignee: Henkel Corporation, Rocky Hill, CT (US)

( * ) Notice: Subject to any disclaimer, the term of this patent is extended or adjusted under 35 U.S.C. 154(b) by 1192 days.

(21) Appl. No.: 10/510,458

(22) PCT Filed: Mar. 24, 2003

(86) PCT No.: PCT/US03/08802

§ 371 (c)(1),
(2), (4) Date: Aug. 15, 2005

(87) PCT Pub. No.: WO03/087204

PCT Pub. Date: Oct. 23, 2003

(65) Prior Publication Data

US 2006/0014844 A1    Jan. 19, 2006

(51) Int. Cl.
*C08J 9/02* (2006.01)
*C08G 77/00* (2006.01)
(52) U.S. Cl. .............................. 521/77; 521/82; 521/88; 521/94; 521/110; 521/129; 521/154
(58) Field of Classification Search .................... 521/82, 521/88, 94, 110, 129, 154
See application file for complete search history.

(56) References Cited

U.S. PATENT DOCUMENTS

| | | | | |
|---|---|---|---|---|
| 4,767,794 A | * | 8/1988 | Modic et al. ................... | 521/82 |
| 4,808,634 A | | 2/1989 | Uriarte et al. .................. | 521/87 |
| 5,061,736 A | | 10/1991 | Takahashi et al. .............. | 521/91 |
| 5,246,973 A | | 9/1993 | Nakamura et al. ............ | 521/54 |
| 5,356,940 A | | 10/1994 | Giesen ......................... | 521/77 |
| 5,358,975 A | | 10/1994 | Anderson ..................... | 521/77 |
| 5,373,027 A | | 12/1994 | Hanley et al. .............. | 521/84.1 |
| 5,575,526 A | | 11/1996 | Wyech ........................ | 296/205 |
| 5,900,430 A | | 5/1999 | Badger et al. ................ | 514/409 |
| 6,003,274 A | | 12/1999 | Wycech ........................ | 52/232 |
| 6,092,864 A | | 7/2000 | Wycech et al. .............. | 296/204 |
| 6,110,982 A | | 8/2000 | Russick et al. ................ | 521/54 |
| 6,207,730 B1 | | 3/2001 | Hogan, III ................... | 523/219 |
| 6,218,442 B1 | | 4/2001 | Hilborn et al. ................ | 521/85 |
| 6,277,898 B1 | | 8/2001 | Pachl et al. .................. | 522/100 |

* cited by examiner

*Primary Examiner*—Irina S Zemel
(74) *Attorney, Agent, or Firm*—Steven C. Bauman

(57) ABSTRACT

A two-part curable foaming composition comprising:
(A) A first part comprising:
  (i) an alkoxysilyl capped prepolymer; and
  (ii) a polyhydrogen siloxane;
  (iii) optionally a catalyst which accelerates both foaming and cross-linking through said alkoxysilyl groups; and
(B) A second part comprising:
  (i) a nitrogen-containing compound having an active hydrogen;
  (ii) water; and
  (iii) optionally a catalyst which accelerates both foaming and cross-linking through said alkoxysilyl groups;
provided that at least one of the parts contain a catalyst and wherein after mixing together the first and second parts a cured elastomeric foam is formed.

21 Claims, No Drawings

_US 7,674,838 B2_

CURABLE FOAM ELASTOMERIC COMPOSITIONS

FIELD OF THE INVENTION

The present invention relates to two-part curable foaming compositions which are particularly useful for sealing, adhesive applications, gap filling, noise reduction and vibration dampening. More particularly, the compositions of the present invention relate to elastomeric compositions which undergo condensation curing and which release hydrogen during the cure process to result in a cured elastomeric foam as an end product.

BACKGROUND OF RELATED TECHNOLOGY

Elastomeric foaming compositions have been developed for a variety of purposes. For example, the resiliency of elastomeric foamed compositions have advantages as noise and vibration dampening materials. Additionally, gaps can be filled by the expansion of the composition as it foams and eventually thermosets its shape during final cure. Additionally, foaming elastomeric compositions have been used in thermal insulation and electrical applications as well as flame resistant barrier applications. Many commercially available products are known and promoted for these purposes.

For example, U.S. Pat. No. 4,808,634 discloses a curable foaming silicone composition containing a vinyl polysiloxane, a hydride polysiloxane, a hydroxyl source selected from organic alcohol or organic alcohol in combination with water or hydroxylated organosiloxane, from 1 to about 250 ppm of platinum catalyst and a ketoximine compound effective to lower the foam density. Foam is created through the reaction of the hydride polysiloxane with the hydroxy source to liberate hydrogen gas. The platinum catalyst is necessary for cure and the ketoximine is recited as a critical element in the composition for reducing the density of the resultant foam.

U.S. Pat. No. 5,358,975 also relates to organosiloxane elastomeric foams. The '975 patent incorporates a triorganosiloxy end-blocked polydiorgano siloxane, an organohydrogen siloxane, a platinum catalyst, an a, β, ω-diol and a resinous copolymer containing siloxy vinyl groups. The combination of the specific diols and the resinous copolymer are recited as providing reduced density foams. Foaming is produced as a result of the reaction of the polyhydrogen siloxane and the alcohol which liberate hydrogen gas.

Numerous patents disclose the addition of blowing agents to effectuate foams. For example, see U.S. Pat. Nos. 6,110,982 and 5,373,027.

U.S. Pat. No. 6,207,730 B1 discloses an epoxy composition to which is added thermoplastic shell microspheres for inhibition of seepage of the epoxy through porous substrates. The microspheres may encapsulate a gas.

U.S. Pat. No. 6,277,898 B1 discloses epoxy resins useful as photocurable paints which use chemical or mechanical expansion agents to create foams.

U.S. Pat. No. 5,356,940 discloses a fine pored silicone foam which is formed by mixing a vinyl silicone, an organo-platinum catalyst, fumed silica, and water as a first part, with a second part which includes a silicone polymer having at least two double bonds per molecule, finned silica and polydimethylhydrogensiloxane. The two components are mixed and the reaction is subsequently pressurized, using air or nitrogen, so that the pressurized gas is present in the mixture in a dissolved form. Subsequently, the reaction mixture is heated and the dissolved gas is released, thereby forming a fine pored silicone foam.

U.S. Pat. No. 5,900,430 discloses silicone foaming compositions which contain an organopolysiloxane containing a specified amount of an alkenyl group and/or a hydroxyl group, an organohydrogenpolysiloxane, a compound having an active hydrogen, such as an alcohol, a platinum catalyst and an acetylenic alcohol compound. Foaming occurs during the cure process by the reaction of the compound having an active hydrogen group, i.e., an alcohol, with the organohydrogenpolysiloxane compound to release hydrogen gas.

U.S. Pat. No. 5,246,973 discloses a foamable silicone composition that evolves neither toxic gas or hydrogen. The foamable silicone composition comprises a thermosetting liquid silicone and 0.1 to 30 parts by weight of a thermally expansible hollow plastic micro particles. The thermosetting liquid silicone is a diorganopolysiloxane component containing alkenyl groups. An organopolysiloxane that contains at least two silicon-bonded hydrogen atoms in each polymer and a platinum metal catalyst are also included. The inclusion of the hollow plastic micro particle functions as a blowing or foaming agent that causes the composition to yield the foam.

U.S. Pat. No. 5,061,736 discloses foamable silicone compositions useful as fire-resistant joint-sealing members. The compositions disclosed contain a diorganopolysiloxane, a finely divided reinforcing silica filler, a powder of a ferrite such as a divalent metallic element such as manganese, copper, nickel, from 10 to 70 parts by weight of a finely divided inorganic material, such as mica or glass powders, finely divided platinum metal, a curing agent for silicone rubbers such as a peroxide or condensation catalyst, and the blowing agent is a composition which produces a foaming gas when exposed to elevated temperature, such as nitrogen, carbon dioxide, azobisiobutyronitrile. The blowing agent is present in the range of about 1 to 10 parts by weight.

U.S. Pat. No. 6,003,274 discloses a reinforcement web for a hollow structural member having layer of expandable foam dispersed on its principal surfaces. The foam is a resin-based material containing a blowing agent.

U.S. Pat. Nos. 5,575,526 and 6,092,864 also disclose laminates which have support members or beams bonded together with a structural foam layer. A synthetic structural resin is combined with a cell-forming agent (blowing agent) and hollow microspheres to produce the structural foam layer.

U.S. Pat. No. 6,218,442 B1 discloses a corrosion-resistant foam formulation which includes one or more thermosettable synthetic resins, one or more curatives, one or more blowing agents and one or more organic titanates or zirconates. The disclosed synthetic resins include epoxies.

Notwithstanding the state of the art, there is a continued need for curable foaming compositions which do not require the addition of blowing agents for creation of the foam, but rather rely on the in situ formation of hydrogen gas which is liberated during the curing process.

SUMMARY OF THE INVENTION

The present invention produces curable foaming elastomeric compositions which produce an elastomeric foam in situ without the addition of blowing agents. The compositions of the present invention rely on the reaction of water and polyhydrogensiloxane crosslinking agent in the presence of a catalytic amount of one or more amines to react and liberate hydrogen gas which results in the formation of a closed celled foam as the composition undergoes condensation curing.

In one aspect of the invention there is provided a two-part curable foaming composition including: (A) A first part including (i) an alkoxysilyl capped prepolymer; (ii) a polyhydrogen siloxane; and (iii) optionally a catalyst which accelerates both foaming and cross-linking through said alkoxysilyl groups; and (B) a second part including: (i) a nitrogen-containing compound having an active hydrogen; (ii) water; and (iii) optionally a catalyst which accelerates both foaming and cross-linking through said alkoxysilyl groups; provided that at least one of the parts contain a catalyst and wherein after mixing together the first and second parts a cured elastomeric foam is formed. The reaction product of this composition provides the cured elastomeric foam.

In another aspect of the invention there is provided an elastomeric foam which includes the reaction product of a first part including an alkoxysilyl capped prepolymer and a polyhydrogen siloxane; and a second part including a nitrogen-containing compound having an active hydrogen, water and a catalyst.

In yet another aspect of the invention there is provided a moisture curable foaming composition which includes an alkoxysilyl capped prepolymer, a polyhydrogen siloxane, a nitrogen-containing compound having an active hydrogen for reaction with the polyhydrogen siloxane and which nitrogen-containing compound accelerates cross-linking of the alkoxysilyl groups, and water.

In yet another aspect of the invention there is provided a sound and vibration dampening composition made from the aforementioned compositions.

In yet another aspect of the invention there is provided a composite structure including first and second substrates and an elastomeric foam positioned therebetween. The elastomeric foam includes the reaction product of an alkoxysilyl capped prepolymer, a polyhydrogen siloxane, a nitrogen-containing compound having an active hydrogen, water and a catalyst which accelerates both foam formation and cross-linking through the alkoxysilyl group.

It is contemplated that the nitrogen containing compound having an active hydrogen may also be a compound which accelerates both the foam formation and cross-linking of the alkoxysilyl group, eliminating the need for a separate catalyst. Ordinarily, primary and secondary amines having an active hydrogen do not provide the combination of rapid cure and foam formation without additional catalyst.

In yet another aspect of the invention there is provided a method of filling the gap between two substrate surfaces including providing a two-part curable foaming composition including: (A) a first part including: (i) an alkoxysilyl capped prepolymer; (ii) a polyhydrogen siloxane; and (iii) optionally a catalyst which accelerates both foaming and cross-linking through said alkoxysilyl groups; and (B) a second part including: (i) a nitrogen-containing compound having an active hydrogen; (ii) water; and (iii) optionally a catalyst which accelerates both foaming and cross-linking through said alkoxysilyl groups; provided that at least one of the parts contain a catalyst and where upon mixing together the first and second parts a cured elastomeric foam is formed; and permitting the composition to form a cured foam therebetween.

In yet another aspect of the invention there is provided a method of making a noise and vibration dampening seal between surfaces including the steps of introducing a composition between the surfaces which includes A two-part curable foaming composition including: (A) a first part including: (i) an alkoxysilyl capped prepolymer; (ii) a polyhydrogen siloxane; and (iii) optionally a catalyst which accelerates both foaming and cross-linking through said alkoxysilyl groups; and (B) a second part including: (i) a nitrogen-containing compound having an active hydrogen; (ii) water; and (iii) optionally a catalyst which accelerates both foaming and cross-linking through said alkoxysilyl groups; provided that at least one of the parts contain a catalyst and wherein after mixing together the first and second parts a cured elastomeric foam is formed; and permitting the composition to form a cured foam.

In yet another aspect of the invention there is provided a method of manufacturing a self-lubricating, foaming composition, including providing a curable composition including an alkoxysilyl capped prepolymer, a polyhydrogen siloxane, a nitrogen-containing compound having an active hydrogen for reaction with the polyhydrogen siloxane, a catalyst for accelerating foam formation and cross-linking through the alkoxysilyl group and water; providing to the curable composition a silicone/polyether surfactant; dispensing the composition onto a substrate surface; exposing the composition to conditions favorable to generating a cured foam; and permitting the surfactant to migrate to the surface to provide a lubricious surface.

In a further aspect of the invention there is provided a two-part curable foaming composition including: (A) a first part including: (i) an alkoxysilyl capped prepolymer; (ii) a polyhydrogen siloxane; and (iii) optionally a catalyst which accelerates both foaming and cross-linking through said alkoxysilyl groups; (B) a second part including: (i) a nitrogen-containing compound having an active hydrogen and which accelerates both foaming and cross-linking through said alkoxysilyl groups; and (ii) water; wherein after mixing together the first and second parts a cured elastomeric foam is formed.

In a further aspect of the invention there is provided a two-part curable foaming composition which provides a lubricous surface including: a two-part curable foaming composition including: (A) a first part including: (i) an alkoxysilyl capped prepolymer; (ii) a polyhydrogen siloxane; and (iii) optionally a catalyst which accelerates both foaming and cross-linking through said alkoxysilyl groups; (iv) optionally, a lubricant; and (B) a second part including: (i) a nitrogen-containing compound having an active hydrogen; (ii) water; and (iii) optionally a catalyst which accelerates both foaming and cross-linking through said alkoxysilyl groups; (iv) optionally, a lubricant; provided that at least one of the parts contain a catalyst and a lubricant and wherein after mixing together the first and second parts a cured elastomeric foam is formed.

The compositions of the present invention are capable of room temperature cure desirably, temperatures greater than ambient are used to achieve more rapid cure times.

DETAILED DESCRIPTION OF THE INVENTION

The present invention provides for two-part curable foaming compositions which include a variety of thermosetting compositions as the structural component. The thermosetting resins are formed from polymer materials which may have a variety of different types of polymeric backbones and which are end-capped with alkoxysilyl-groups in order to undergo condensation curing. Desirably these materials are elastomeric in nature to provide the design and properties of vibration and sound dampening. In general, such alkoxysilyl end-capped thermosetting compositions include those described in U.S. Pat. No. 5,663,269, which is incorporated herein by reference. Generally, these materials are prepolymers which can be further reacted to form fully cured materials.

In particular, such alkoxysilyl end-capped compositions include those of the formula:

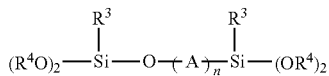

wherein: A may be a siloxy repeating group

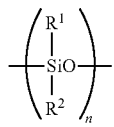

which may contain a heteroatom-containing group, such as a N, S or O containing group either as a linkage in the repeating siloxy group or as a group pendent to the siloxy group; an alkylene or alkylene oxide group, such as ethylene or propylene oxide; a polyester, polyester/urethane group; a polyether or polyether/urethane group; an epoxy group; or a copolymer of any of the above combinations and admixtures of these materials are also useful; $R^1$, $R^2$, $R^3$ and $R^4$ may be identical or different and are monovalent hydrocarbon radicals having up to 10 carbon atoms ($C_{1-10}$) or halo or cyano substituted hydrocarbon radicals; $R^3$ may also be $OR^4$ or a monovalent heterohydrocarbon radical having up to 10 carbon atoms ($C_{1-10}$) wherein the hetero atoms are selected from O, N and S; $R^4$ may be alkyl($C_{1-10}$), preferably methyl, ethyl or isopropyl; $R^4$ may also be $CH_2CH_2OCH_3$; and n is an integer, desirably from 1 to 12,000.

Particularly useful alkoxylsilyl end-capped prepolymers include those having the formula:

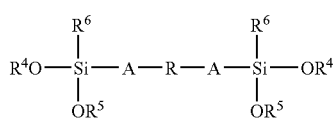

wherein R is a hydrocarbon diradical which may include heteroatom groups; A is a $C_{1-30}$ linear or branched, substituted or unsubstituted aliphatic group or an aromatic-containing group; $R^4$ is methyl; $R^5$ is a substituted or unsubstituted $C_{1-24}$ alkyl or aryl group; $R^4$ may also be the same as $R^5$ provided A includes a carboxy, carbamate, carbonate, ureido or urethane group; $R^6$ is an $C_{1-24}$ alkyl, alkylene or aryl group, a (meth)arcryloxyalkyl group or

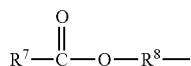

$R^8$ is $C_{1-4}$ diradical hydrocarbon; $R^7$ is an alkenyl group; $R^6$ may also be $R^4O$ or $R^5O$.

Desirably, R is a polymer selected from the group consisting of polyesters, polyethers, polyolefins, polyurethanes, polysiloxanes, poly(meth)acrylates, polyepoxides and combinations thereof.

The polyhydrogen siloxane useful in the present invention includes those having the formula:

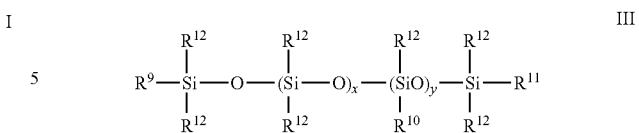

wherein at least two of $R^9$, $R^{10}$ and $R^{11}$ are H; otherwise $R^9$, $R^{10}$ and $R^{11}$ can be the same or different and can be a substituted or unsubstituted hydrocarbon radical from $C_{1-20}$ such hydrocarbon radicals including those as previously defined for formula I above; thus the SiH group may be terminal, pendent or both; $R^{12}$ can also be a substituted or unsubstituted hydrocarbon radical from $C_{1-20}$ such hydrocarbon radicals including those as previously defined for formula I above, and desirably is an alkyl group such as methyl; x is an integer from 10 to 1,000; and y is an integer from 1 to 20. Desirably R groups which are not H are methyl. The polyhydrogen siloxane is desirably present in amounts sufficient to achieve the desired amount of crosslinking and generate a sufficient amount of foam. Desirably, amounts of about 0.1 to about 10% by weight of the composition are useful.

The aforementioned alkoxysilyl end-capped prepolymeric materials and the polyhydrogen siloxane compound are generally combined as a first part, e.g., Part A, of the two-part curable foaming compositions. Desirably, the alkoxysilyl end-capped material is present in amounts of about 20 to about 80% by weight of the first part and about 10% to about 70% by weight of the total composition, i.e., the combined first (A) and second (B) parts.

The second part (B) of the present invention includes a nitrogen-containing component, which has an active nitrogen present for reaction with the polyhydrogen siloxane and subsequent production and release of hydrogen gas. The release of hydrogen gas during cure results in the formation of a cured foam. Additionally, the second part includes water which is necessary to effectuate the condensation cure of the two-part composition.

Desirably, either the first part or the second part, or both parts include a catalyst which accelerates the foam formation and cross-linking through the alkoxysilyl groups. The catalyst is generally a distinct component from the nitrogen-containing compound having an active hydrogen, although it is contemplated that a single compound may serve both for hydrogen donation, i.e., production of hydrogen gas, and for cross-linking through the alkoxysilyl groups.

The nitrogen-containing component is generally a primary or secondary amine and may be chosen from a wide number of compounds. For example, suitable amines include, but are not limited to, primary amines represented by the formula $R^{13}NH_2$, secondary amines represented by the formula $R^{13}_2NH$, and tertiary amines represented by the formula $R^{13}_3N$, wherein each $R^{13}$ is independently selected from the group consisting of alkyl, aryl, alkaryl, or aralkyl radicals, preferably, $C_{1-10}$ alkyl, $C_{6-10}$ aryl, $C_{7-15}$ alkaryl, and $C_{7-15}$ aralkyl radicals. Non-limiting examples of suitable amine co-activators include tri-n-butylamine, dimethyl-p-toluidine, dimethyl-o-toluidine, diethyl-p-toluidine, and di-2-hydroxyethyl-p-toluidine.

Similarly, the nature of the primary or secondary amine is not critical for purposes of this invention, i.e., aliphatic or aromatic amines can be used. For example, primary aliphatic amines such as ethyl, n-butyl, n-propyl, iso-propyl, n-hexyl and t-butyl amines conveniently can be used. Also primary aromatic amines, such as aniline, p-toluidine, o- or p-naphthalamine, xylidene, benzylamine or p-benzylaniline can be used. While the primary amines are preferred amines for use in preparing the condensation products disclosed herein, aliphatic or aromatic secondary amines also can be used. Typically examples of acceptable secondary amines are diethylamine, dipropylamine, diisopropylamine, diphenylamine, N-phenyl benzylamine and N-allylaniline.

Amine-aldehyde condensation products are also useful as the nitrogen-containing compound. Typical examples of aldehyde-amine condensation products which are useful in the invention disclosed herein are the following: formaldehyde-p-benzyl aniline; acetaldehyde-benzylamine; crotonaldehyde-butylamine; cinnamic aldehyde-aniline; cinnamic aldehyde-butylamine; 2-phenylpropionaldehyde-butylamine; butyraldehyde-butyl-amine; butyraldehydreaniline; hydrocinnamaldehyde-butylamine; naphthaldehyde-o-toluidine; and heptaldehyde-N-allylaniline.

Additional useful amine compounds include dicyandiamide, diethylenetriamine, triethylenetetramine, diethylaminopropylamine, m-xylenediamine, diaminodiphenylamine, isophoronediamine, menthenediamine, polyamides, and combinations thereof.

Useful aliphatic cycloaliphatic amines include 2,2'-dimethyl-4,4'-methylene-bis(cyclohexylamine) (Ancamine 2049). Useful aromatic amines include 4,4'-diaminodiphenyl sulfone (Ancamine S and Ancamine SP). A blend of aromatic and aliphatic amines (i.e., Ancamine 2038) is also useful. Dissociable amine salts are also useful.

Various imidazoles are also useful as the nitrogen-containing compound in the present invention provided they have an active hydrogen. For example, useful compounds include, without limitation, 1-(2-cyanomethyl)-2-ethyl-$\alpha$-4-methylimidazole and 2-phenyl-4,5-dihydroxymethyl imidazole; imidazole, isoimidazole, 2-methyl imidazole, 2-ethyl-4-methylimidazole, 2,4-dimethylimidazole, butylimidazole, 2-heptadecenyl-4-methylimidazole, 2-undecenylimidazole, 1-vinyl-2-methylimidazole, 2-n-heptadecylimidazole, 2-undecylimidazole, 2-heptadecylimidazole, 1-benzyl-2-methylimidazole, 1-propyl-2-methylimidazole, 1-cyanoethyl-2-methylimidazole, 1-cyanoethyl-1-cyanoethyl-2-undecylimidazole, 1-cyanoethyl-2-phenylimidazole, 1-guanaminoethyl-2-methylimidazole, addition products of an imidazole and trimellitic acid, addition products of an imidazole and 2-n-heptadecyl-4-methylimidazole, phenylimidazole, benzylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethylaminophenyl)-4,5-diphenylimidazole, 2-(2-hydroxyphenyl)-4,5-diphenylimidazole, di(4,5-diphenyl-2-imidazole)-benzene-1,4,2-naphthyl-4,5-diphenylimidazole, 1-benzyl-2-methylimidazole, 2-p-methoxystyrylimidazole, and combinations thereof.

The nitrogen-containing component is generally present in amounts of about 0.1% to about 10% by weight of the second part (B) of the two-part composition and desirably in amounts of about 0.05% to about 2% by weight of the total composition (A+B).

Water is present in amounts of about 0.1% to about 10% by weight of the second part (B) of the two-part composition and desirably in amounts of about 0.05% to about 5.0% by weight of the total composition (A+B). Due to the presence of water in the formulation, the CTV can be chosen and adjusted to a wide variety of depths. Whereas high CTV is often a difficult property to achieve in some condensation curing polymers, it is an advantage of the present inventon to be able to do so.

The catalyst, which may be in either or both of the parts, is one which will accelerate both the formation of the film, i.e., the formation of hydrogen gas and also one which accelerates cross-linking through the alkoxysilyl groups. Desirably, the catalyst is present in the second part (B). Desirably the catalyst is one which is considered a strong Lewis base. The catalyst is preset in amounts of about 0.05 to about 3% by weight of the total composition.

Examples of catalysts include 1,8-diazobicyclo(5,5,0)undec-7-ene, quinuclidine and 1,4-diazobicyclo(2,2,2)octane.

A lubricous additive is also desirably incorporated into the composition. This additive provides a lubricous surface to the reaction product of the composition. Generally, the lubricous additive migrates to the surface of the composition during and/or after cure. Desirably, the additive is a liquid. A liquid which is partially soluble in the composition. More desirably, the additive is a surfactant which is compatible with the composition for providing a lubricous surface. The additive is optionally present in amounts of up to about 20% by weight of the total composition.

The two-part curable foaming compositions of the present invention desirably include the following constituents:

| CONSTITUENT | WEIGHT % |
|---|---|
| Part A | |
| Alkoxysilyl Capped Prepolymer | 20-80 |
| Polyhydrogen Siloxane | 0.1-0.5 |
| Filler | 25-60 |
| Plasticizer | 15-20 |
| Lubricous Additive | 0-20 |
| Part B | |
| Active Hydrogen-Containing Amine Compound | 0.05-2.0 |
| Filler | 50-80 |
| Plasticizer | 0-40 |
| Water | 0.1-10 |
| Catalyst | 0.05-3.0 |
| Lubricous Additive | 0-30 |

Other moisture cure catalysts may also be employed in the present invention. Such catalysts would ordinarily be present in Part B as opposed to Part A containing the reactive silicone prepolymer, for stability purposes. Nonlimiting examples of useful moisture cure catalysts include from about 0.1 to about 5% by weight and desirably about 0.25 to about 2.5% by weight of at least one compound of a metal which is typically selected from among titanium, tin, zirconium and mixtures thereof. Tetraisopropoxytitanate, tetrabutoxytitanate, dibutyltindilaurate and dibutyltindiacetate are specific examples. U.S. Pat. No. 4,111,890 lists numerous others that are useful.

EXAMPLES

The following compositions represented by Tables 1-11 were prepared in accordance with the present invention. Parts A and B were mixed together using a static mixer and heated at 100° C. A cured elastomeric foam resulted in approximately 10 minutes. The foaming occurred within seconds of the parts being mixed. Within 24 hours of cure, surface lubricity was present due to the lubricant present in the composition. Each of the compositions were cured on acrylic coated polycarbonate automotive parts. The cure-through-volume (CTV) of the compositions varied from about ⅛" to ¼" in thickness (depth).

The tensile peel strength of each of the inventive compositions was tested. All test pieces exhibited 100% cohesive failure, which was the desired result. The substrate surface was fully covered by the composition subsequent to peel, showing excellent adhesion. Additionally, the compositions exhibited properties useful for sound and vibration dampening.

Example 1

A two-part curable foaming composition of the present invention was prepared as set forth below. To form Part A, the trimethoxysilyl capped prepolymer component was mixed with the calcium carbonate filler until the liquid prepolymer fully wet the mixture. This mixture was then heated to 110° C. and a full vacuum was pulled on the mixture. The heating and vacuum was performed for one hour, sufficient time to dry the calcium carbonate. To the mixture was then added the remainder of Part A constituents, TINUVIN 327, TINUVIN 765, the polyether/silicone surfactant, and the polyhydrogensiloxane. The mixture was mixed for ten minutes and de-aerated.

TABLE 1

| CONSTITUENT | Weight % In part A |
|---|---|
| Tri-methoxysilyl capped polypropylene oxide | 38.0 |
| Niax L-1602 (Polyether/Silicone Copolymer surfactant) | 28.0 |
| Calcium Carbonate | 31.6 |
| Methyl Hydrogen Polysiloxane | 1.2 |
| (Bis) and (Methyl)-(1,2,2,6,6-Pentamethyl-4-piperidinyl) sebacate (TINUVIN 765) | 0.4 |
| 2-(3,5-Di-(tert)-butyl-2hydroxyphenyl)-4-chlorobenzotriazole (TINUVIN 327) | 0.8 |

Part B was then added to Part A by first adding the plasticizers and fillers (butylbenzylthalate, calcium carbonate, and carbon black) until the liquid wet these components. Water and the nitrogen-containing curatives were then added and the entire mixture was mixed for twenty minutes.

TABLE 2

| CONSTITUENT | Weight % In Part B |
|---|---|
| Butyl Benzyl Phthalate | 25.0 |
| Calcium Carbonate | 72.2 |
| Carbon Black | 0.6 |
| Dibutylamine | 0.6 |
| Tap water | 0.6 |
| 1,8-Diazaobicyclo(5,4,0) undec-7-ene | 1.0 |

The results of mixing components A and B together was a rapidly curing, foaming elastomeric material which exhibited excellent noise reduction, vibration dampening, and gap filling ability.

Table 3 below is representative of the overall mixed composition, i.e., Parts A and B mixed together, of this composition.

TABLE 3

| CONSTITUENT | Weight % |
|---|---|
| Butyl Benzyl Phthalate | 12.5 |
| Niax Silicone L-1602 | 14.0 |
| Calcium Carbonate | 51.9 |

TABLE 3-continued

| CONSTITUENT | Weight % |
|---|---|
| Trimethoxysilyl capped polypropylene oxide | 19 |
| Carbon Black | 0.3 |
| Methyl Hydrogen Polysiloxane | 0.6 |
| 2-(3,5-Di-(tert)-butyl-2hydroxyphenyl)-4-chlorobenzotriazole | 0.4 |
| (Bis) and (Methyl)-(1,2,2,6,6-Pentamethyl-4-piperidinyl) sebacate | 0.2 |
| Dibutylamine | 0.3 |
| Water | 0.3 |
| 1,8-Diazobicyclo(5,4,0) undec-7-ene | 0.5 |

Example 2

TABLE 4

| CONSTITUENT | Weight % In part A |
|---|---|
| Tri-methoxysilyl capped polypropylene oxide | 60.0 |
| Niax L-1602 (Polyether/Silicone Copolymer surfactant) | 16.0 |
| Calcium Carbonate | 21.8 |
| Methyl Hydrogen Polysiloxane | 1.0 |
| (Bis) and (Methyl)-(1,2,2,6,6-Pentamethyl-4-piperidinyl) sebacate (TINUVIN 765) | 0.4 |
| 2-(3,5-Di-(tert)-butyl-2hydroxyphenyl)-4-chlorobenzotriazole (TINUVIN 327) | 0.8 |

Part B was then added to Part A by first adding the plasticizers and fillers (butylbenzylthalate, calcium carbonate, and carbon black) until the liquid wet these components. Water and the nitrogen-containing curatives were then added and the entire mixture was mixed for twenty minutes.

TABLE 5

| CONSTITUENT | Weight % In Part B |
|---|---|
| Butyl Benzyl Phthalate | 18.0 |
| Niax L-1602 (Polyether/Silicone Copolymer surfactant) | 8.0 |
| Calcium Carbonate | 71.8 |
| Carbon Black | 0.3 |
| Dibutylamine | 0.6 |
| Tap water | 0.6 |
| 1,8-Diazaobicyclo(5,4,0) undec-7-ene | 0.7 |

After 10 minutes at 100° C. and 2 hours at room temperature, the foam was found to be uniform and have a Shore hardness of 30. The surface slowly became increasing lubricous and after 24 hours had excellent surface lubricity.

Example 3

TABLE 6

| CONSTITUENT | Weight % In part A |
|---|---|
| Tri-methoxysilyl capped polypropylene oxide | 38.0 |
| Niax L-1602 (Polyether/Silicone Copolymer surfactant) | 24.0 |
| Calcium Carbonate | 35.8 |
| Methyl Hydrogen Polysiloxane | 1.0 |
| (Bis) and (Methyl)-(1,2,2,6,6-Pentamethyl-4-piperidinyl) sebacate (TINUVIN 765) | 0.4 |

TABLE 6-continued

| CONSTITUENT | Weight % In part A |
| --- | --- |
| 2-(3,5-Di-(tert)-butyl-2hydroxyphenyl)-4-chlorobenzotriazole (TINUVIN 327) | 0.8 |

Part B was then added to Part A by first adding the plasticizers and fillers (butylbenzylthalate, calcium carbonate, and carbon black) until the liquid wet these components. Water and the nitrogen-containing curatives were then added and the entire mixture was mixed for twenty minutes.

TABLE 7

| CONSTITUENT | Weight % In Part B |
| --- | --- |
| Butyl Benzyl Phthalate | 26.0 |
| Calcium Carbonate | 71.2 |
| Carbon Black | 0.6 |
| Dibutylamine | 0.6 |
| Tap water | 0.6 |
| 1,8-Diazaobicyclo(5,4,0) undec-7-ene | 1.0 |

After 10 minutes at 100° C. and 2 hours at room temperature, the foam was found to be uniform and have a Shore hardness of 40. The surface slowly became increasing lubricous and after 24 hours had excellent surface lubricity.

Example 4

TABLE 8

| CONSTITUENT | Weight % In part A |
| --- | --- |
| Tri-methoxysilyl capped polypropylene oxide | 38.0 |
| Niax L-1602 (Polyether/Silicone Copolymer surfactant) | 15.0 |
| Calcium Carbonate | 44.6 |
| Methyl Hydrogen Polysiloxane | 1.2 |
| (Bis) and (Methyl)-(1,2,2,6,6-Pentamethyl-4-piperidinyl) sebacate (TINUVIN 765) | 0.4 |
| 2-(3,5-Di-(tert)-butyl-2hydroxyphenyl)-4-chlorobenzotriazole (TINUVIN 327) | 0.8 |

Part B was then added to Part A by first adding the plasticizers and fillers (butylbenzylthalate, calcium carbonate, and carbon black) until the liquid wet these components. Water and the nitrogen-containing curatives were then added and the entire mixture was mixed for twenty minutes.

TABLE 9

| CONSTITUENT | Weight % In Part B |
| --- | --- |
| Butyl Benzyl Phthalate | 10.0 |
| Niax L-1602 (Polyether/Silicone Copolymer surfactant) | 15.0 |
| Calcium Carbonate | 72.0 |
| Carbon Black | 0.6 |
| Dibutylamine | 0.6 |
| Tap water | 0.6 |
| 1,8-Diazaobicyclo(5,4,0) undec-7-ene | 1.2 |

After 10 minutes at 100° C. and 2 hours at room temperature, the foam was found to be uniform and have a Shore hardness of 55. The surface slowly became increasing lubricous and after 24 hours had excellent surface lubricity Example 5

TABLE 10

| CONSTITUENT | Weight % In part A |
| --- | --- |
| Tri-methoxysilyl capped polypropylene oxide | 38.0 |
| Niax L-1602 (Polyether/Silicone Copolymer surfactant) | 18.0 |
| Calcium Carbonate | 41.2 |
| Methyl Hydrogen Polysiloxane | 1.6 |
| (Bis) and (Methyl)-(1,2,2,6,6-Pentamethyl-4-piperidinyl) sebacate (TINUVIN 765) | 0.4 |
| 2-(3,5-Di-(tert)-butyl-2hydroxyphenyl)-4-chlorobenzotriazole (TINUVIN 327) | 0.8 |

Part B was then added to Part A by first adding the plasticizers and fillers (butylbenzylthalate, calcium carbonate, and carbon black) until the liquid wet these components. Water and the nitrogen-containing curatives were then added and the entire mixture was mixed for twenty minutes.

TABLE 11

| CONSTITUENT | Weight % In Part B |
| --- | --- |
| Niax L-1602 (Polyether/Silicone Copolymer surfactant) | 25.0 |
| Calcium Carbonate | 71.8 |
| Carbon Black | 0.6 |
| Dibutylamine | 0.6 |
| Tap water | 0.6 |
| 1,8-Diazaobicyclo(5,4,0) undec-7-ene | 1.4 |

After 10 minutes at 100° C. and 2 hours at room temperature, the foam was found to be uniform and have a Shore hardness of 45. The surface slowly became increasing lubricous and after 24 hours had excellent surface lubricity

What is claimed is:

1. A two-part curable foaming composition comprising:
   (A) A first part comprising:
      (i) an alkoxysilyl capped prepolymer; and
      (ii) a polyhydrogen siloxane;
      (iii) optionally a catalyst which accelerates both foaming and cross-linking through alkoxysilyl groups on the alkoxysilyl capped prepolymer; and
   (B) A second part comprising:
      (i) a nitrogen-containing compound having an active hydrogen;
      (ii) water; and
      (iii) optionally a catalyst which accelerates both foaming and cross-linking through alkoxysilyl groups on the alkoxysilyl capped prepolymer;
   provided that at least one of the parts contains a catalyst and wherein after mixing together the first and second parts a cured elastomeric foam is formed.

2. The two-part curable foaming composition of claim 1, wherein the elastomeric foam is formed under temperatures greater than ambient.

3. The two-part curable foaming composition of claim 1, wherein the first and/or second part further comprise a lubricous agent.

4. The two-part curable foaming composition of claim 3, wherein said lubricous agent comprises a silicone/polyether surfactant.

5. The two-part curable foaming composition of claim 4, wherein the surfactant creates a surface of the elastomeric foam.

6. The two-part curable foaming composition of claim 1, wherein the nitrogen-containing compound is a primary or secondary amine.

7. The two-part curable foaming composition of claim 1, wherein said catalyst is a strong Lewis base.

8. The two-part curable foaming composition of claim 1, wherein said catalyst is an amine condensation catalyst.

9. The two-part curable foaming composition of claim 1, wherein the catalyst is selected form the group consisting of 1,8-diazobicyclo (5,4,0)-undec-5-ene(DBU);
dibutylamine; quinuclidine; 1,4-diazabicyclo(2,2,2) octane, and combinations thereof.

10. The two-part curable foaming composition of claim 1, wherein the alkoxysilyl capped prepolymer comprises the reaction product of a isocyanoalkylenetrialkoxy silane with a polyether diol.

11. The two-part curable foaming composition of claim 1, wherein the alkoxysilyl capped prepolymer comprises a trimethoxysilyl capped diurethane polyether.

12. The two-part curable foaming composition of claim 10, wherein the polyether diol comprises polypropylene oxide diol.

13. The two-part curable foaming composition of claim 1, wherein the foaming composition further comprises fillers, plasticizers, catalysts, stabilizers, lubricants, surfactants and combinations thereof.

14. A moisture curable foaming composition comprising an alkoxysilyl capped polymer, a polyhydrogen siloxane, a nitrogen-containing compound having an active hydrogen, and water.

15. A sound and vibration dampening composition comprising the two part curable foaming composition of claim 1.

16. A method of filling the gap between two substrate surfaces comprising:
(A) Providing a two-part curable foaming composition comprising:
 (a) A first part comprising:
  (i) an alkoxysilyl capped prepolymer; and
  (ii) a polyhydrogen siloxane;
  (iii) optionally a catalyst which accelerates both foaming and cross-linking through alkoxysilyl groups on the alkoxysilyl capped prepolymer; and
 (b) A second part comprising:
  (i) a nitrogen-containing compound having an active hydrogen;
  (ii) water; and
  (iii) optionally a catalyst which accelerates both foaming and cross-linking through alkoxysilyl groups on the alkoxysilyl capped prepolymer;
provided that at least one of the parts contains a catalyst and wherein after mixing together the first and second parts a cured elastomeric foam is formed
(A) Combining the parts in the gap between the substrates; and
(B) Permitting the composition to form a cured foam therebetween.

17. A method of making a noise and vibration dampening seal between surfaces comprising the steps of:
introducing between the surfaces a composition comprising a mixture of:
(a) A first part comprising:
 (i) an alkoxysilyl capped prepolymer; and
 (ii) a polyhydrogen siloxane;
 (iii) optionally a catalyst which accelerates both foaming and cross-linking through alkoxysilyl groups on the alkoxysilyl capped prepolymer; and
(b) A second part comprising:
 (i) a nitrogen-containing compound having an active hydrogen;
 (ii) water; and
 (iii) optionally a catalyst which accelerates both foaming and cross-linking through alkoxysilyl groups on the alkoxysilyl capped prepolymer;
provided that at least one of the parts contains a catalyst and wherein after mixing together the first and second parts a cured elastomeric foam is formed, permitting the composition to form a cured foam.

18. A method of manufacturing a self-lubricating, foaming composition, comprising:
(A) providing a curable composition comprising an alkoxysilyl capped prepolymer, a polyhydrogen siloxane, a nitrogen-containing compound having an active hydrogen for reaction with the polyhydrogen siloxane, water and a catalyst which accelerates both foaming and cross-linking through alkoxysilyl groups on the alkoxysilyl capped prepolymer;
(B) providing to the curable composition a silicone/polyether surfactant;
(C) dispensing the composition onto a substrate surface;
(D) exposing the composition to conditions favorable to generating a cured foam; and
(E) permitting the surfactant to migrate to the surface to provide a lubricious surface.

19. The method of claim 18, further comprising joining a second substrate surface to the lubricious surface of the cured foam.

20. A two-part curable foaming composition comprising:
(A) A first part comprising:
 (i) an alkoxysilyl capped prepolymer; and
 (ii) a polyhydrogen siloxane;
 (iii) optionally a catalyst which accelerates both foaming and cross-linking through alkoxysilyl groups on the alkoxysilyl capped prepolymer;
(B) A second part comprising:
 (i) a nitrogen-containing compound having an active hydrogen and which accelerates both foaming and cross-linking through said alkoxysilyl groups; and
 (ii) water,
wherein after mixing together the first and second parts a cured elastomeric foam is formed.

21. A two-part curable foaming composition which provides a lubricous surface comprising:
(A) A first part comprising:
 (i) an alkoxysilyl capped prepolymer; and
 (ii) a polyhydrogen siloxane;
 (iii) optionally a catalyst which accelerates both foaming and cross-linking through alkoxysilyl groups on the alkoxysilyl capped prepolymer;
 (iv) optionally, a lubricant; and
(B) A second part comprising:
 (i) a nitrogen-containing compound having an active hydrogen;
 (ii) water, and
 (iii) optionally a catalyst which accelerates both foaming and cross-linking through alkoxysilyl groups on the alkoxysilyl capped prepolymer;
 (iv) optionally, a lubricant;
provided that at least one of the parts contain a catalyst and a lubricant and wherein after mixing together the first and second parts a cured elastomeric foam is formed.

* * * * *